US011508174B2

(12) United States Patent
Yamamoto (10) Patent No.: US 11,508,174 B2
(45) Date of Patent: Nov. 22, 2022

(54) IMAGE PROCESSING METHOD AND IMAGE PROCESSING DEVICE

(71) Applicant: Yamaha Corporation, Shizuoka (JP)

(72) Inventor: Kazuhiko Yamamoto, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 106 days.

(21) Appl. No.: 17/094,404

(22) Filed: Nov. 10, 2020

(65) Prior Publication Data

US 2021/0056303 A1    Feb. 25, 2021

Related U.S. Application Data

(63) Continuation of application No. PCT/JP2019/020683, filed on May 24, 2019.

(30) Foreign Application Priority Data

May 30, 2018 (JP) .............................. JP2018-103440

(51) Int. Cl.
*G06V 30/414* (2022.01)
*G06K 9/62* (2022.01)
*G06V 10/46* (2022.01)
*G06V 10/75* (2022.01)

(52) U.S. Cl.
CPC ......... *G06V 30/414* (2022.01); *G06K 9/6232* (2013.01); *G06V 10/462* (2022.01); *G06V 10/757* (2022.01)

(58) Field of Classification Search
None
See application file for complete search history.

(56) References Cited

U.S. PATENT DOCUMENTS

| 5,402,339 A | 3/1995 | Nakashima et al. |
| 11,106,865 B2* | 8/2021 | Campbell ............ G11B 27/00 |
| 2006/0285772 A1* | 12/2006 | Hull ...................... G06F 16/955 |
| | | 707/E17.02 |

(Continued)

FOREIGN PATENT DOCUMENTS

| JP | H06110945 A | 4/1994 |
| JP | 2010097379 A | 4/2010 |

(Continued)

OTHER PUBLICATIONS

International Search Report in PCT/JP2019/020683, dated Aug. 13, 2019.

*Primary Examiner* — Santiago Garcia
(74) *Attorney, Agent, or Firm* — Global IP Counselors, LLP (57) ABSTRACT

An image processing method implemented by a computer includes extracting feature points from captured images that are sequentially generated by an image capture device and include at least a first captured image and a second captured image generated prior to the first captured image, determining whether the number of feature points extracted from the first captured image exceeds a threshold value, and specifying a location of the first captured image relative to the second captured image upon determining that the number of the feature points extracted from the first captured image is below the threshold value.

14 Claims, 5 Drawing Sheets

(56) References Cited

U.S. PATENT DOCUMENTS

2009/0161164 A1\* 6/2009 Goto .................... G06V 30/414
                                                      382/113
2017/0124740 A1\* 5/2017 Campbell ............... G06F 40/18
2018/0089527 A1\* 3/2018 Aoki ...................... G06V 10/25

FOREIGN PATENT DOCUMENTS

JP      2010122840 A     6/2010
JP      2018049569 A     3/2018

\* cited by examiner

IMAGE PROCESSING METHOD AND IMAGE PROCESSING DEVICE

CROSS-REFERENCE TO RELATED APPLICATIONS

This application is a continuation application of International Application No. PCT/JP2019/020683, filed on May 24, 2019, which claims priority to Japanese Patent Application No. 2018-103440 filed in Japan on May 30, 2018. The entire disclosures of International Application No. PCT/JP2019/020683 and Japanese Patent Application No. 2018-103440 are hereby incorporated herein by reference.

BACKGROUND

Technological Field

The present disclosure relates to a technology for analyzing an image obtained by photographing a document such as a musical score or a book.

Background Information

Technologies for searching a desired musical piece of a user have been proposed in the prior art. For example, Japanese Patent Application Laid-Open Publication No. H6-110945 discloses a technology for searching a musical piece containing a time series of musical notes subsequently specified by the user from among a plurality of candidates.

SUMMARY

An image of a musical score, composed of a plurality of pages, captured by means of an image capture device (hereinafter referred to as "captured image") can be compared with each of a plurality of candidate images representing different pages in said musical score in order to specify the location of the captured image (for example, the page number) within the musical score. However, in a state in which the imaging magnification of the image capture device is high enough (for example, in a state in which the image capture device is close enough to the paper surface of the musical score), an appropriate comparison of the captured image and the candidate image is inhibited. Therefore, it becomes difficult to estimate the location of the captured image within the musical score with high accuracy. A captured image obtained by photographing a musical score is illustrated as an example in the foregoing explanation, but the same problem can occur when an image obtained by photographing a document such as a novel is analyzed. In consideration of such circumstances, an object of one aspect of the present disclosure is to appropriately identify the location of a captured image in a musical score or a document such as a book.

In order to solve the problem described above, an image processing method according to one aspect of the present disclosure comprises extracting feature points from captured images that are sequentially generated by the image capture device and include at least a first captured image and a second captured image generated prior to the first captured image, determining whether the number of feature points extracted from the first captured image exceeds a threshold value, and specifying a location of the first captured image relative to the second captured image upon determining that the number of the feature points extracted from the first captured image is less than the threshold value.

An image processing device according to another aspect of the present disclosure comprises an electronic controller including at least one processor. The electronic controller is configured to execute a plurality of modules including an extraction module that extracts feature points from captured images that are sequentially generated by the image capture device and include at least a first captured image and a second captured image generated prior to the first captured image, a determination module that determines whether the number of feature points extracted from the first captured image exceeds a threshold value, and an analysis module that specifies a location of the first captured image relative to the second captured image upon the determination module determining that the number of the feature points extracted from the first captured image is less than the threshold value.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
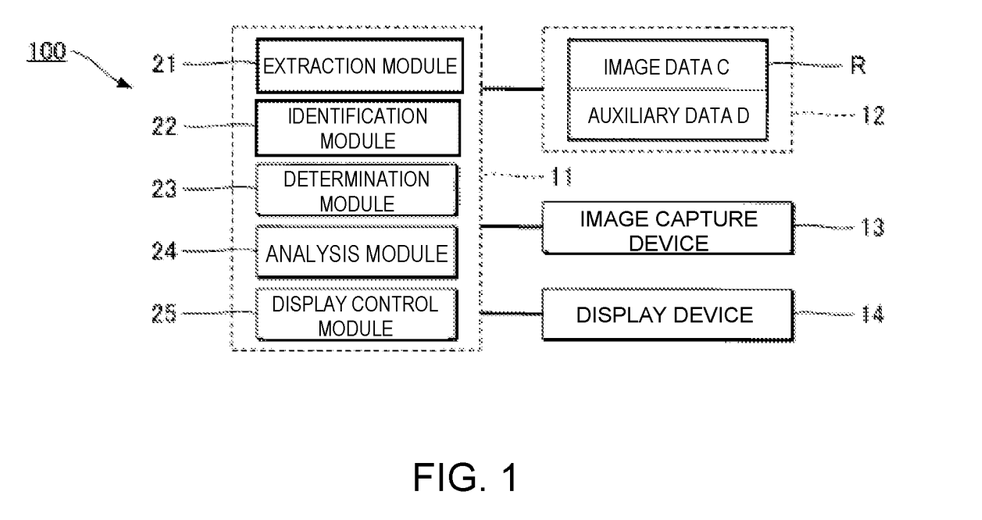
FIG. 1 is a block diagram illustrating a configuration of an image processing device according to a first embodiment.

FIG. 1 is a block diagram illustrating the configuration of an image processing device 100 according to a first embodiment. As shown in FIG. 1, the image processing device 100 according to the first embodiment is realized by a computer system comprising an electronic controller 11, a storage device 12, an image capture device 13, and a display device 14. The image processing device 100 can be a portable information terminal such as a mobile phone or a smartphone, or a portable or stationary information terminal such as a personal computer, for example.

The image capture device 13 is an image input device that generates images obtained by photographing a subject (hereinafter referred to as the "captured image"). Specifically, the image capture device 13 comprises an imaging element such as an image sensor, which photographs a subject within an imaging range corresponding to the viewing angle of an optical system such as a photographic lens. The captured image is represented by image data in any format. The image capture device 13 according to the first embodiment sequentially generates captured images at a prescribed cycle. That is, a moving image composed of a time series of a plurality of captured images is generated. In the first embodiment, an example is shown of a configuration in which the image capture device 13 is mounted in the image processing device 100; however, it is also possible to connect the image capture device 13, which is separate from the image processing device 100, to the image processing device 100 wirelessly or by wire. That is, the image capture device 13 can be omitted from the image processing device 100.

Figure 2:
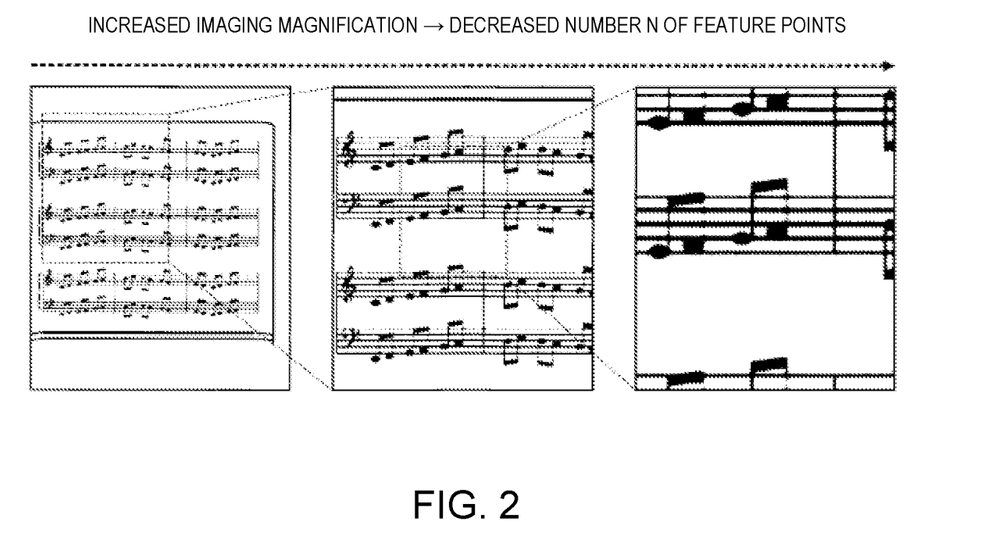
FIG. 2 is a schematic diagram illustrating the relationship between an imaging magnification of an image capture device and the range of a captured image.

The user uses the image capture device 13 to capture images of a musical score of a musical piece. The user can freely move the imaging device 13 toward or away from the paper surface of the musical score. That is, as shown in FIG. 2, the range of the musical score represented by the captured image changes over time. In FIG. 2, the time series of the captured images sequentially generated by the image capture device 13 as the image capture device 13 is gradually brought closer to the paper surface of the musical score are arranged from left to right in the figure. As shown in FIG. 2, as the image capture device 13 approaches the paper surface of the musical score, the imaging magnification increases and the imaging range in the musical score decreases. The imaging magnification of the image capture device 13 can also be optically adjusted by operating the optical system of the photographic lens, etc. In addition, the imaging magnification can also be electronically adjusted by means of image processing the image data of the captured image.

The electronic controller 11 is a processing circuit (processor), such as a CPU (Central Processing Unit), and comprehensively controls each element of the image processing device 100. The term "electronic controller" as used herein refers to hardware that executes software programs. The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). The electronic controller 11 according to the first embodiment analyzes the captured images sequentially generated by the image capture device 13 in order to identify musical score information and page numbers. The musical score information is information for identifying the musical score represented by the captured image. For example, the title of the musical piece represented by the musical score and an identification number uniquely assigned to the musical score can be used as musical score information. The page number is the number of the page represented by the captured image from among the plurality of pages constituting the musical score. That is, the page number represents the location of the portion within the musical score represented by the captured image.

A program that is executed by the electronic controller 11 and various data that are used by the electronic controller 11 are stored in the storage device 12. The storage device 12 can be any computer storage device or any computer readable medium with the sole exception of a transitory, propagating signal. For example, a known storage medium, such as a magnetic storage medium or a semiconductor storage medium, or a combination of a plurality of various types of storage media can be freely employed as the storage device 12.

The storage device 12 according to the first embodiment stores reference data R for each of a plurality of images (hereinafter referred to as "candidate images") prepared in advance. Each of the plurality of candidate images is an image representing one page of the musical score for which the musical score information and page number are known. A plurality of pieces of reference data R corresponding to different candidate images are stored in the storage device 12 for each of a plurality of musical pieces. The reference data R corresponding to any one candidate image are composed of image data C and auxiliary data D relating to said candidate image. The auxiliary data D of each candidate image specify the page number and the musical score information of the musical score represented by the candidate image.

Figure 3:
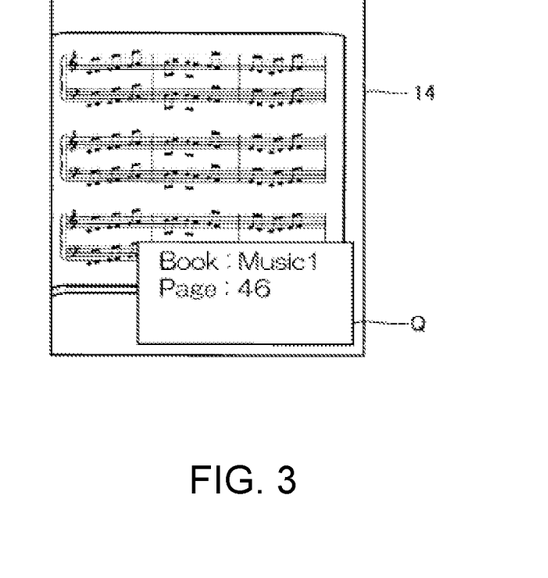
FIG. 3 is a display example of a display device in a case in which the number of feature points exceeds a threshold value.

The display device 14 displays various images under the control of the electronic controller 11. For example, a display such as a liquid-crystal display panel or an organic EL (Electroluminescent) display panel is suitably used as the display device 14. As shown in FIG. 3, the display device 14 according to the first embodiment displays the captured images sequentially generated by the image capture device 13 in real time, in parallel with the image capture carried out by the image capture device 13. That is, a live view display of the captured images is carried out. In addition, the display device 14 display an information area Q together with the captured images. The information area Q contains musical score information (Book) of the musical score represented by the captured image and the page number (Page) corresponding to the captured image.

Of the plurality of candidate images whose reference data R are stored in the storage device 12, the musical score information and the page number represented by the auxiliary data D of one candidate image corresponding to the captured image are displayed in the information area Q. The candidate image corresponding to the captured image is, for example, a candidate image that includes a portion similar to the captured image. By visually checking the information area Q of the display device 14, the user can ascertain the page number and the musical score information of the musical score that is actually being captured by the image capture device 13.

As shown in FIG. 1, the electronic controller 11 according to the first embodiment executes a plurality of modules (extraction module 21, identification module 22, determination module 23, analysis module 24, display control module 25) for analyzing the captured images sequentially generated by the image capture device 13 to realize a plurality of functions. Moreover, the modules (functions) of the electronic controller 11 can be realized by a group of a plural devices (that is, a system), or some or all of the modules (functions) of the electronic controller 11 can be realized by a dedicated electronic circuit.

The extraction module 21 extracts a plurality of feature points from the captured images sequentially generated by the image capture device 13. Feature points are characteristic points in the captured image. The extraction of the feature points is sequentially executed for each captured image. Any known image analysis technique such as SIFT (Scale-Invariant Feature Transform), SURF (Speeded Up Robust Features), KAZE (KAZE Features), or AKAZE (Accelerated KAZE) can be employed for the extraction of the feature points. The number N of the feature points extracted from each captured image is different for each captured image. Specifically, as shown in FIG. 2, as the imaging magnification of the image capture device 13 increases (that is, as the imaging range in the musical score decreases), the number N of feature points tends to decrease. The number N is a counted number and an integer greater than or equal to zero.

The identification module 22 identifies the candidate image corresponding to the captured image from among the plurality of candidate images. Specifically, the identification module 22 calculates a similarity index for each of the plurality of candidate images by comparing the candidate images with the captured images, and identifies the candidate image with the highest similarity index from among the plurality of candidate images. The similarity index is an index indicating the degree of similarity between the candidate image and the captured image. For example, a similarity index indicating the degree of similarity between the distribution of feature points in the candidate image and the distribution of feature points in the captured image is calculated. Any known image processing technique can be employed for comparing the candidate image and the captured image. By means of identification of the candidate image corresponding to the captured image (for example, a candidate image that includes a portion similar to the captured image), the page number and the musical score information specified by the auxiliary data D of the candidate image are identified as the page number and the musical score information of the captured image. As can be understood from the foregoing explanation, the identification module 22 functions as an element that identifies the page number and the musical score information of the captured image.

As described above, as the imaging magnification of the image capture device 13 increases, the number N of feature points decreases. In a state in which the number N of feature points is small, it is difficult appropriately to compare the captured image with each candidate image. That is, it becomes difficult to calculate a similarity index that suitably expresses the degree of similarity between the captured image and the candidate image. In light of such circumstances, in the first embodiment, whether the candidate image is to be compared with each candidate image is controlled in accordance with the number N of capture points in the captured image.

The determination module 23 of FIG. 1 determines whether the number N of feature points extracted from the captured image exceeds a prescribed threshold value Nth. The threshold value Nth is set statistically or experimentally so as to exceed the minimum number of feature points in the candidate image that can be appropriately compared with the candidate image. If the determination module 23 determines that the number N of feature points of the captured image exceeds the threshold value Nth, the identification module 22 executes a comparison between the captured image and each candidate image. If, on the other hand, the determination module 23 determines that the number N of feature points of the captured image is less than the threshold value Nth, the identification module 22 does not execute a comparison between the captured image and each candidate image. That is, the page number and the musical score information of the captured image are not identified.

If the number N of feature points extracted from the captured image is less than the threshold value Nth, the analysis module 24 identifies the location of the captured image with respect to a specific reference image. The reference image is a captured image (an example of a second captured image) generated by the image capture device 13 previous to the captured image. Specifically, the most recent (newest) captured image for which the number N of feature points exceeds the threshold value Nth is used as the reference image. As shown in FIG. 2, since the number N of feature points decreases as the imaging magnification increases (that is, as the musical score is magnified), a captured image in which the number N of feature points is less than the threshold value Nth corresponds to a portion of the reference image. The analysis module 24 according to the first embodiment generates location information representing the location of the captured image with respect to the reference image. The location information is information representing the relative location of the captured image with respect to the reference image, and is expressed as coordinates in a coordinate plane in which two mutually orthogonal axes are set, for example.

Figure 4:
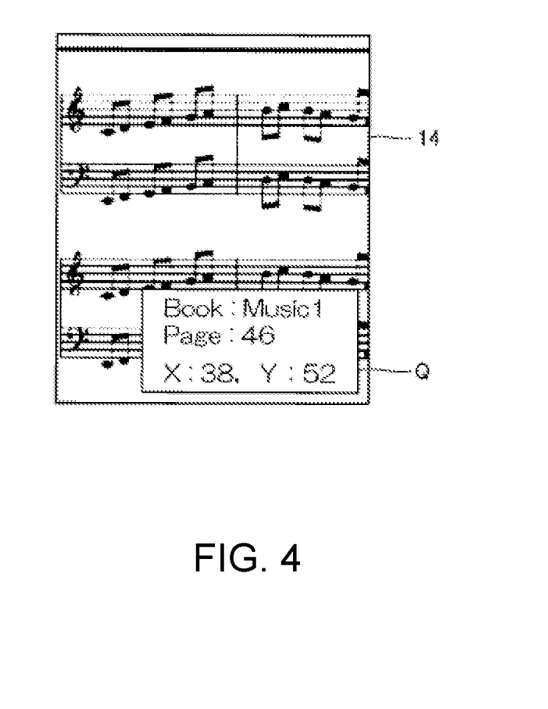
FIG. 4 is a display example of a display device in the case in which the number of feature points is below the threshold value.

The display control module 25 displays various images on the display device 14. The display control module 25 according to the first embodiment displays on the display device 14 the captured images sequentially generated by the image capture device 13 and the information area Q relating to the captured images, in parallel with the image capture carried out by the image capture device 13. Specifically, with regard to a captured image for which the number N of feature points exceeds the threshold value Nth, reference information including the page number and the musical score information, identified by the identification module 22 by means of comparison with each candidate image, are displayed on the display device 14, as shown in FIG. 3. On the other hand, with regard to a captured image for which the number N of feature points is less than the threshold value Nth, the page number and the musical score information identified for the reference image, and the location information (specifically, the X coordinate and the Y coordinate) generated by the analysis module 24 regarding said captured image, are displayed, as shown in FIG. 4. Thus, the user is able to ascertain the location of the captured image even in a state in which the imaging magnification of the image capture device 13 is high enough (for example, in a state in which the image capture device 13 is close enough to the paper surface of the musical score).

Figure 5:
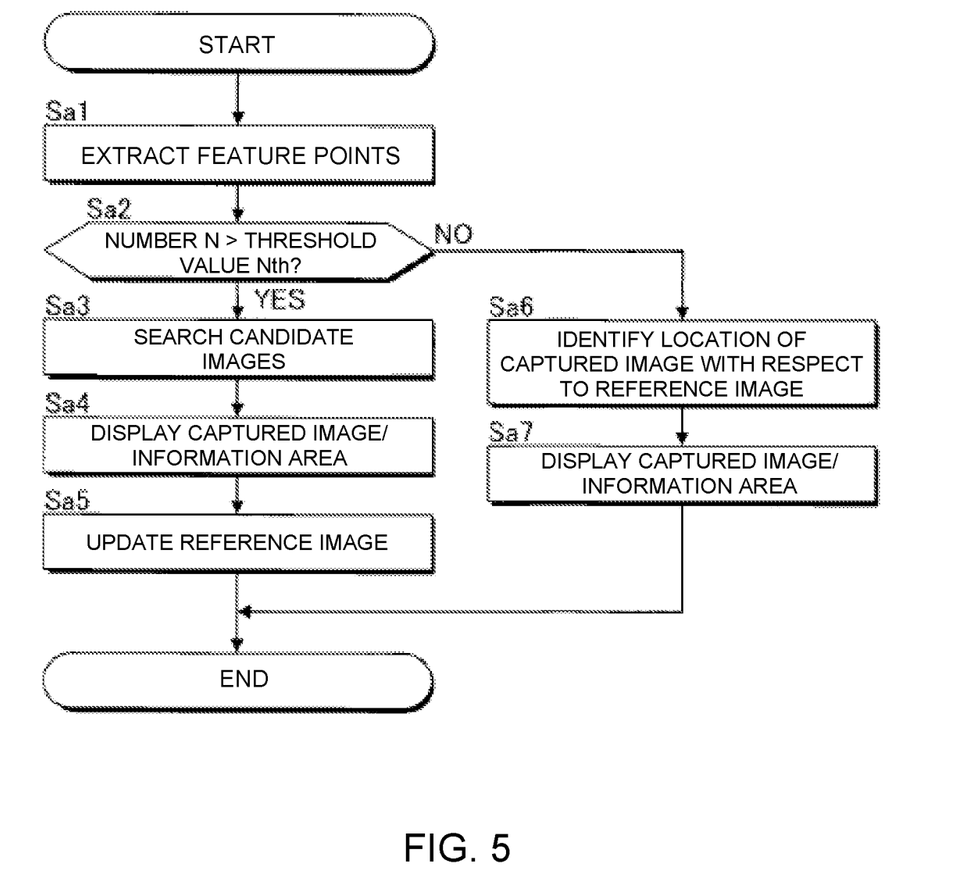
FIG. 5 is a flowchart showing a specific procedure of a process executed by a control device.

FIG. 5 is a flowchart showing a specific procedure of a process (example of an image processing method) executed by the image processing device 100. The process of FIG. 5 is executed each time a captured image is captured by the image capture device 13. When the process of FIG. 5 is started, the extraction module 21 extracts feature points from the captured image (example of a first captured image) (Sa1). The determination module 23 determines whether the number N of feature points exceeds the threshold value Nth (Sa2).

If the determination module 23 determines that the number N exceeds the threshold value Nth (Sa2: YES), the identification module 22 identifies the candidate image corresponding to the captured image from among the plurality of candidate images (Sa3). Specifically, the identification module 22 calculates a similarity index for each candidate image by comparing each of the plurality of candidate images with the captured image and identifies the candidate image with the highest similarity index from among the plurality of candidate images. The display control module 25 displays, in the information area Q, the page number and the musical score information of the candidate image corresponding to the captured image specified by the auxiliary data D as the page number and the musical score information of the captured image (Sa4).

If the number N exceeds the threshold value Nth, the identification module 22 updates the reference image stored in the storage device 12 to the current captured image (Sa5). That is, the reference image is updated each time a captured image for which the number N of feature points exceeds the threshold value Nth is captured. As can be understood from the foregoing explanation, the most recent captured image for which the number N of feature points exceeds the threshold value Nth is stored as the reference image.

On the other hand, if the determination module 23 determines that the number N is less than the threshold value Nth (Sa2: NO), the analysis module 24 identifies the location of the captured image with respect to the reference image stored in the storage device 12 (Sa6). That is, the location information representing the location of the captured image with respect to the reference image is generated. The display control module 25 causes the display device 14 to display the information area Q, including the page number and the musical score information specified for the reference image, and the location information of the captured image at the present time (Sa7). If the number N is equal to the threshold value Nth, either the searching of the candidate image (Sa3) or the generation of the location information (Sa6) can be executed.

As described above, in the first embodiment, if the number N of feature points extracted from the captured image exceeds the threshold value Nth, that is, if the captured image and each candidate image can be appropriately compared, the candidate image corresponding to the captured image is identified from among the plurality of candidate images. On the other hand, if the number N of feature points extracted from the captured image is less than the threshold value Nth, that is, if the captured image and each candidate image cannot be appropriately compared because the imaging magnification of the image capture device 13 is high enough, the location of the captured image with respect to the reference image generated before the captured image is identified. Therefore, the user can appropriately ascertain the location of the captured image.

In addition, the location of the captured image with respect to the reference image is identified using a captured image for which the number N of feature points exceeds the threshold value Nth, that is, a previously captured image that can be appropriately compared with each candidate image, as the reference image. Thus, there is the advantage that the user can appropriately ascertain the location of the captured image within the musical score. Particularly in the first embodiment, the most recent captured image for which the number N of feature points exceeds the threshold value Nth is used as the reference image. Therefore, compared to a configuration in which the time at which the captured image is generated and the time at which the reference image are separated from each other on the time axis, there is the advantage that the location of the captured image within the musical score can be appropriately identified.

Second Embodiment

The second embodiment of the present disclosure will be described. In each of the examples below, elements that have the same functions as in the first embodiment have been assigned the same reference symbols as those used to describe the first embodiment, and detailed descriptions thereof have been appropriately omitted.

Figure 6:
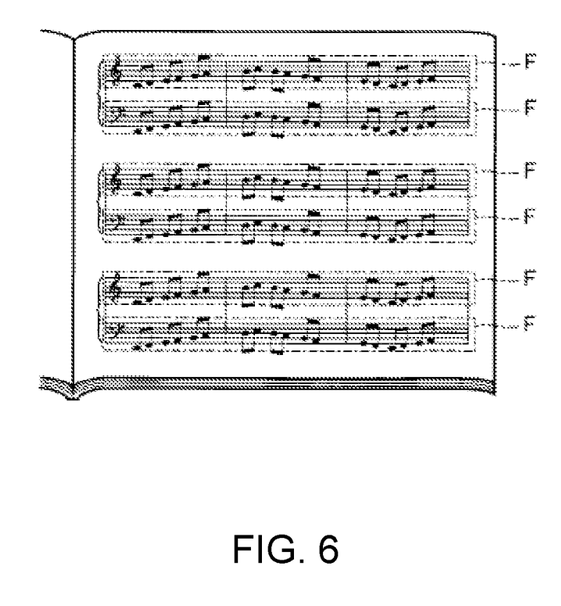
FIG. 6 is an explanatory drawing of a musical staff that constitutes a musical score.

The musical score captured by the image capture device 13 is composed of a plurality of pages. As shown in FIG. 6, each page of the musical score includes a plurality of musical staffs F, which are arranged in parallel and spaced apart from each other in the vertical direction. Each of the plurality of musical staffs F is composed of a plurality of horizontal straight lines representing different pitches. Specifically, each staff F is a staff composed of five straight lines. A plurality of musical score elements including a clef, such as a treble clef or a bass clef, and symbols, such as for notes and rests, are arranged in each of the plurality of staffs F.

Figure 7:
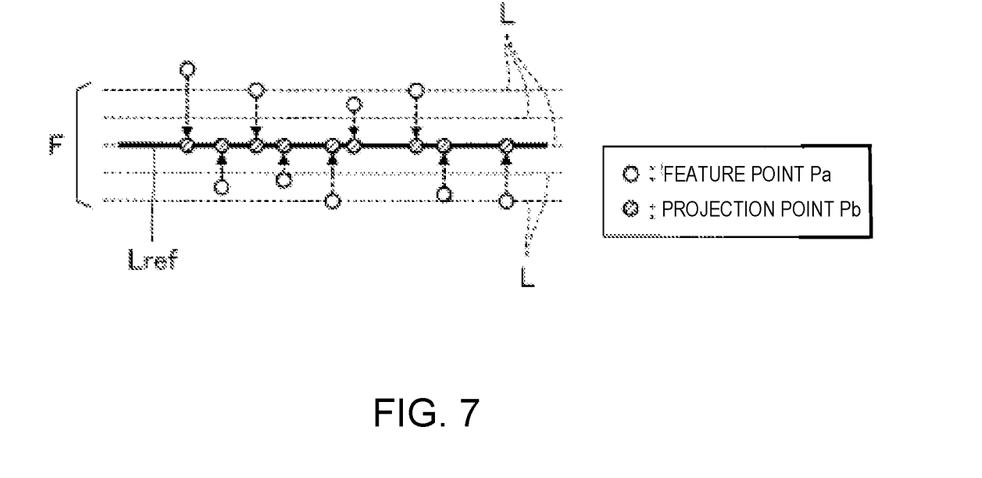
FIG. 7 is an explanatory diagram of analysis data.

FIG. 7 is a schematic diagram for explaining the image data C of the candidate image according to the second embodiment. FIG. 7 shows a plurality of feature points Pa extracted from the candidate image and a reference line Lref along a plurality of straight lines L that constitute the musical staff F of the candidate image. A projection point Pb of FIG. 7 is a point where one feature point Pa is projected (specifically, orthographically projected) onto the reference line Lref. That is, a projection point Pb is a point of intersection between the reference line Lref and a perpendicular of the reference line Lref that passes through one feature point Pa (foot of the perpendicular). The image data C of each candidate image in the second embodiment is composed of a plurality of pieces of analysis data Z corresponding to different musical staffs F of the candidate image. The analysis data Z corresponding to any one musical staff F in the candidate image are vector data representing a set of a plurality of projection points Pb obtained by projecting a plurality of feature points Pa of the candidate image onto the reference line Lref corresponding to said staff F.

The identification module 22 according to the second embodiment analyzes the captured images photographed by the image capture device 13 to generate the analysis data Z, and compares each of the plurality of pieces of analysis data Z stored in the storage device 12 for different candidate images with the analysis data Z of the captured image, in order to identify the candidate image corresponding to the captured image.

Figure 8:
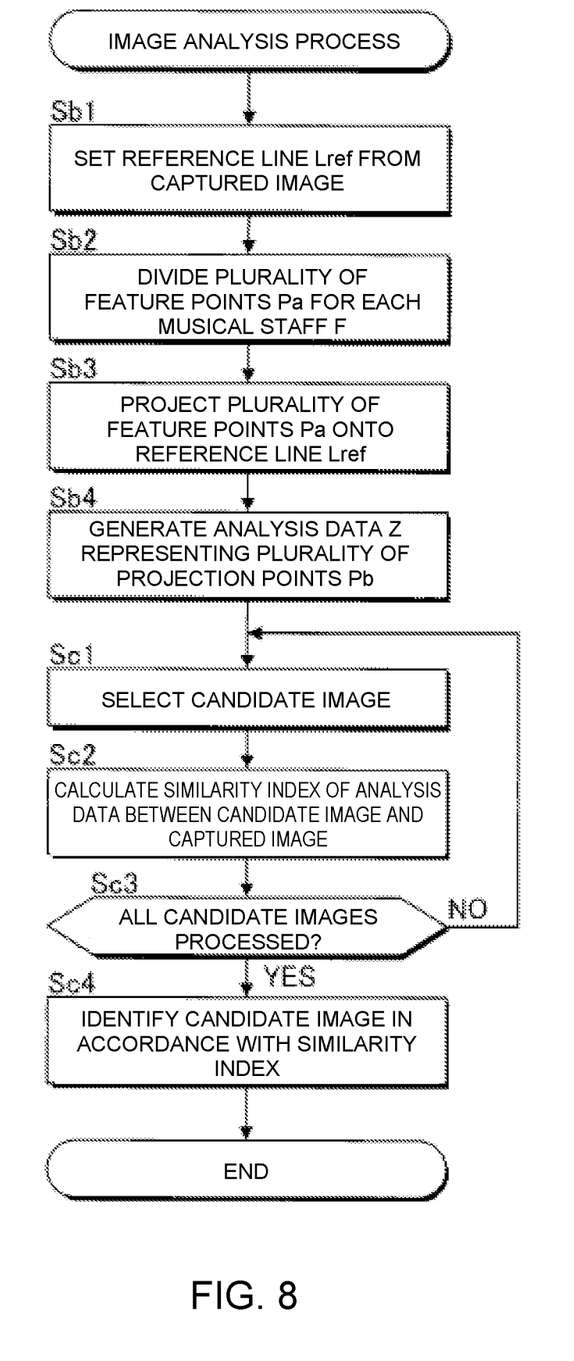
FIG. 8 is a flowchart of an image analysis process according to a second embodiment.

FIG. 8 is a flowchart illustrating the specific procedure of a process (hereinafter referred to as "image analysis process") in which the electronic controller 11 according to the second embodiment identifies the candidate image corresponding to the captured image. The image analysis process of FIG. 8 is executed in Step Sa3 of FIG. 5. When the image analysis process is started, the identification module 22 generates the analysis data Z by means of analysis of the captured image (Sb1-Sb4).

The identification module 22 sets the reference line Lref for the captured image (Sb1). Specifically, the identification module 22 extracts each of the straight lines L constituting the musical staff F from the captured image and sets the reference line Lref that is parallel to the plurality of straight lines L. For example, the identification module 22 divides (clusters the plurality of horizontal straight lines L, extracted from the captured image, for each musical staff F, and sets the reference line Lref that passes through the midpoint of the musical staff F in the vertical direction, and that extends in the horizontal direction along the straight lines L of the musical staff F.

The identification module 22 divides the plurality of feature points Pa extracted from the captured image in Step Sa1 into a plurality of sets (clusters) for each musical staff F (Sb2). Any known clustering technique can be employed for the division of the plurality of feature points Pa. In the case that only one musical staff F is included in the captured image, the process of Step Sb2 may be omitted.

The identification module 22, identifies a plurality of projection points Pb for each musical staff F included in the captured image by projecting the plurality of feature points Pa onto the reference line Lref (Sb3). That is, the identification module 22 projects each of the plurality of feature points Pa extracted from the vicinity of one arbitrary musical staff F onto the reference line Lref orthographically, in order to specify a plurality of projection points Pb. The identification module 22 generates the analysis data Z representing the plurality of projection points Pb specified in the foregoing process (Sb4). The analysis data Z of each candidate image are generated by executing the process illustrated above (Sb1-Sb4) with respect to the candidate image and are stored in the storage device 12.

When the analysis data Z of the captured image are generated by means of the foregoing process, the identification module 22 compares each of the plurality of pieces of analysis data Z stored in the storage device 12 for different candidate images and the analysis data Z of the captured image, in order to identify the candidate image corresponding to the captured image (Sc1-Sc4). The specific processing procedure is as follows.

The identification module 22 selects one of the plurality of candidate images (Sc1) and calculates the similarity index between the analysis data Z of the candidate image and the analysis data Z of the captured image (Sc2). For example, an arbitrary index indicating the distance or correlation between the analysis data Z of the candidate image and the analysis data Z of the captured image is suitable as the similarity index. In the following description, a case is assumed in which the similarity index becomes a larger value when the analysis data Z of the candidate image and the analysis data Z of the captured image are more similar.

The identification module 22 determines whether the similarity index with the captured image has been calculated for all of the candidate images (Sc3). If there is a candidate image for which the similarity index has not been calculated (Sc3: NO), the identification module 22 selects a new, unselected candidate image and calculates the similarity index between the analysis data Z of the candidate image and the analysis data Z of the captured image (Sc2).

When the process described above is repeated and the similarity index is calculated for all of the candidate images (Sc3: YES), the identification module 22 identifies the candidate image with the highest similarity index from among the plurality of candidate images (Sc4). That is, the candidate image corresponding to the captured image is identified from among the plurality of candidate images. The specific procedure of the image analysis process is as described above.

The same effects as those of the first embodiment are realized in the second embodiment. In the second embodiment, the analysis data Z representing the result of projecting the plurality of feature points Pa extracted from the captured image onto the reference line Lref are compared with each of the plurality of pieces of analysis data Z corresponding to different candidate images. Therefore, the candidate image corresponding to the captured image can be identified with high accuracy. In addition, since a reference line Lref corresponding to the straight lines L included in the captured image is set, there is the advantage the user does not need to set the reference line Lref, for example. However, the user may set the reference line Lref. The method of identifying the candidate image corresponding to the captured image is not limited to the image analysis process according to the second embodiment.

Modified Embodiments

Specific modified embodiments to be added to each of the embodiments cited as examples in the foregoing are illustrated below. Two or more embodiments arbitrarily selected from the following examples can be appropriately combined as long as they are not mutually contradictory.

(1) In the embodiments described above, the most recent captured image for which the number N of feature points exceeds the threshold value Nth is used as the reference image, but the reference image is not limited to the example described above. For example, a captured image photographed by the image capture device 13 when the user carries out a prescribed operation on an input device (not shown) of the image processing device 100 can be used as the reference image.

(2) It is also possible to realize the image processing device 100 with a server device that communicates with terminal devices (for example, mobile phones and smartphones) via a communication network such as the Internet. For example, the image processing device 100 receives a captured image from a terminal device and transmits location information specified by means of analysis of the captured image to the terminal device.

(3) In the embodiments described above, the case in which the image capture device 13 captures the musical score was illustrated, but the subject represented by the captured image is not limited to musical scores. For example, this disclosure can be applied in order to identify a candidate image (for example, one page of a document) from captured images obtained by photographing a document, such as a book. As can be understood from the foregoing explanation, one aspect of the present disclosure is an image processing method for identifying a candidate image corresponding to the captured image from among a plurality of candidate images, by analyzing captured images obtained by photographing a flat subject (for example, a musical score or a document).

(4) The image processing device 100 according to each of the above-described embodiments is realized by means of cooperation between the electronic controller 11 and a program, as is illustrated in each of the above-described embodiments. The program according to each of the above-described embodiments can be stored on a computer-readable storage medium and installed on a computer. The storage medium, for example, is a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. Furthermore, it is also possible to deliver the program to a computer in the form of distribution via a communication network.

(5) For example, the following configurations may be understood from the embodiments cited as examples above.

An image processing method according to an aspect (first aspect) of the present disclosure comprises extracting feature points from captured images that are sequentially generated by the image capture device, determining whether the number of feature points extracted from a first captured image exceeds a threshold value, and specifying the location of the first captured image relative to a second captured image generated prior to the first captured image if the number of feature points extracted from the first captured image is below the threshold value. In the aspect described above, if the number of the feature points extracted from a first captured image is below the threshold value, that is, if the first captured image and each candidate image cannot be appropriately compared because the image capture device is close enough to the subject, for example, the location of the first captured image with respect to a second captured image generated before the first captured image is identified. Therefore, the location of the captured image within the document such as a musical score can be appropriately identified.

In the first aspect, if the number of the feature points extracted from the first captured image exceeds the threshold value, the candidate image corresponding to the first captured image can be identified from among the plurality of candidate images. In the aspect described above, if the number of the feature points extracted from the first captured image exceeds the threshold value, that is, if the first captured image and each candidate image can be appropriately compared, the candidate image corresponding to the first captured image is identified from among the plurality of candidate images. Therefore, the location of the captured image within the document such as a musical score can be appropriately identified.

In the first aspect, the second captured image can be a captured image for which the number of feature points exceeds the threshold value. In the aspect described above, the location of the first captured image with respect to the second captured image for which the number of extracted feature points exceeds the threshold value, that is, with respect to a past captured image that can be appropriately compared with the candidate image, is identified. Therefore, the location of the captured image within the document such as a musical score can be appropriately identified.

In the first aspect, the second captured image can be the most recent captured image of the first captured image for which the number of feature points exceeds the threshold value. In the aspect described above, the location of the first captured image with respect to the second captured image is identified, using a previously captured image that is located closest to the first captured image and for which the number of extracted feature points exceeds the threshold value as the second captured image. Therefore, compared to a configuration in which the time at which the first captured image is generated and the time at which the second captured image are separated from each other on the time axis, the location of the captured image within the document such as a musical score can be appropriately identified.

Aspects of the present disclosure can also be realized by means of an image processing device that executes the image processing method of each of the embodiments described above, or a program that causes a computer to execute the image processing method of the embodiments described above.

What is claimed is:

1. An image processing method implemented by a computer, the image processing method comprising: extracting feature points from captured images that are sequentially generated by an image capture device and include at least a first captured image and a second captured image generated prior to the first captured image; determining whether the number of feature points extracted from the first captured image exceeds a threshold value; and calculating a similarity index between the first captured image and the second captured image and specifying a location on a musical score of the first captured image relative to the second captured image, upon determining that the number of the feature points extracted from the first captured image is below the threshold value.

2. The image processing method according to claim 1, further comprising
identifying a candidate image corresponding to the first captured image from among a plurality of candidate images upon determining that the number of the feature points extracted from the first captured image exceeds the threshold value.

3. The image processing method according to claim 1, wherein
the second captured image is an image for which the number of feature points exceeds the threshold value.

4. The image processing method according to claim 3, wherein
the second captured image is an image which is generated by the image capture device most recently before the first captured image among the captured images and for which the number of feature points exceeds the threshold value.

5. The image processing method according to claim 1, wherein
the first captured image is an image showing a portion of the second captured image.

6. The image processing method according to claim 2, wherein
the identifying of the candidate image is performed by comparing analysis data including projection points obtained by projecting the feature points in the first captured image onto a reference line, and analysis data including projection points obtained by projecting feature points in each of the plurality of candidate images onto a reference line.

7. The image processing method according to claim 1, further comprising
displaying on a display device location information indicating the location of the first captured image relative to the second captured image.

8. An image processing device, comprising: an electronic controller including at least one processor, the electronic controller being configured to execute a plurality of modules including an extraction module that extracts feature points from captured images that are sequentially generated by an image capture device and include at least a first captured image and a second captured image generated prior to the first captured image, a determination module that determines whether the number of feature points extracted from the first captured image exceeds a threshold value, and an analysis module that calculates a similarity index between the first captured image and the second captured image and specifies a location on a musical score of the first captured image relative to the second captured image, upon the determination module determining that the number of the feature points extracted from the first captured image is below the threshold value.

9. The image processing device according to claim 8, wherein
the electronic controller is configured to execute the plurality of modules further including an identification module that identifies a candidate image corresponding to the first captured image from among a plurality of candidate images upon the determination module determining that the number of the feature points extracted from the first captured image exceeds the threshold value.

10. The image processing device according to claim 8, wherein
the second captured image is an image for which the number of feature points exceeds the threshold value.

11. The image processing device according to claim 10, wherein
the second captured image is an image which is generated by the image capture device most recently before the first captured image among the captured images and for which the number of feature points exceeds the threshold value.

12. The image processing device according to claim 8, wherein the first captured image is an image showing a portion of the second captured image.

13. The image processing device according to claim 9, wherein the identification module compares analysis data including projection points obtained by projecting the feature points in the first captured image onto a reference line, and analysis data including projection points obtained by projecting feature points in each of the plurality of candidate images onto a reference line, to identify the candidate image corresponding to the first captured image.

14. The image processing device according to claim 8, further comprising a display device configured to display location information indicating the location of the first captured image relative to the second captured image.

\* \* \* \* \*